United States Patent [19]

Wang

[11] Patent Number: 5,015,619
[45] Date of Patent: May 14, 1991

[54] SUPERCONDUCTING MIRROR FOR LASER GYROSCOPE

[75] Inventor: Xingwu Wang, Alfred, N.Y.
[73] Assignee: Alfred University, Alfred, N.Y.
[21] Appl. No.: 434,717
[22] Filed: Nov. 13, 1989
[51] Int. Cl.⁵ .............................................. G02B 5/08
[52] U.S. Cl. ........................................ 505/1; 350/601; 350/610; 356/350; 372/94
[58] Field of Search ................. 350/601, 610, 642; 356/350; 372/94; 505/1

[56] References Cited

U.S. PATENT DOCUMENTS

| | | | |
|---|---|---|---|
| 4,431,269 | 2/1984 | Barnes, Jr. ........................ | 350/610 |
| 4,764,003 | 8/1988 | Lake et al. ........................ | 350/610 |
| 4,804,915 | 2/1989 | Hoenig ............................. | 324/248 |
| 4,886,776 | 12/1989 | Early et al. ...................... | 350/610 |

Primary Examiner—Bruce Y. Arnold
Assistant Examiner—J. P. Ryan
Attorney, Agent, or Firm—Howard J. Greenwald

[57] ABSTRACT

A superconductive mirror assembly whose reflectivity can be varied is disclosed. This assembly contains an optionally transparent substrate, a superconductive film formed on the substrate, means for measuring the temperature of the superconductive film, means for measuring the reflectivity of the superconductive film, and means for varying the reflectivity of the superconductive film.

16 Claims, 2 Drawing Sheets

SUPERCONDUCTING MIRROR FOR LASER GYROSCOPE

FIELD OF THE INVENTION

A laser gyroscope comprised of at least three mirrors comprised of superconductive material.

BACKGROUND OF THE INVENTION

The laser gyroscope may be used to measure the rate of rotation. The principles underlying its operation are described, e.g., in J. Wilson et al.'s "Lasers: Principles and Applications," (Prentice Hall, New York, 1987), at pages 153-157. Two types of laser gyroscopes are known: ring laser gyroscopes, and optical fiber gyroscopes.

The prior art ring laser gyroscopes are comprised of a source of lasing and optical mirrors. At least two laser beams are used in these devices, one travelling clockwise, and the other travelling counterclockwise. The optical path of the light will vary with the rotational motion of the vehicle which is carrying the gyroscope. The light impinging upon the surfaces of the mirrors is generated by one or more laser cells. A major portion of this light is reflected by the mirrors; and a minor portion of the light is transmitted through at least one of the mirrors. The light transmitted through the mirror(s) may be measured by a system containing an optical sensor(s) and a data processor; and the system can thus detect changes in the rotational motion.

One need not use the optical sensing system continually in the ring gyroscope. It is preferred to use this sensor system intermittently for short periods of time when sensing of the motion is required. However, one should keep the light beams within the gyroscope continually travelling from mirror to mirror for proper operation.

A certain portion of the light beams is transmitted through the mirrors, even when the optical sensor is not on. The amount of light lost to transmission through the mirrors is wasted when the optical sensor is not on, for it diminishes the intensity of the optical beams travelling from mirror to mirror.

It is an object of this invention to provide a mirror whose reflectivity can be varied. When such mirror is used in a laser gyroscope, it can be maintained at high reflectivity at all times when the optical sensor is not on and, when the sensor is on, reduced to a lower reflectivity.

It is another object of this invention to provide a laser gyroscope comprised of at least one mirror whose reflectivity can be varied.

It is yet another object of this invention to provide an optical fiber gyroscope comprised of optical fiber which is superconductive and whose optical transmission properties can be varied.

SUMMARY OF THE INVENTION

In accordance with this invention, there is provided a mirror apparatus comprised of an optically transparent substrate, a superconducting film on at least one surface of said mirror, means for varying the reflectivity of such mirror, means for sensing the transmission of light through the mirror, and means for switching the sensing means off and on.

BRIEF DESCRIPTION OF THE DRAWINGS

The present invention will be more fully understood by reference to the following detailed description thereof, when read in conjunction with the attached drawings, wherein like reference numerals refer to like elements and wherein.

DESCRIPTION OF THE PREFERRED EMBODIMENTS

Figure 1:
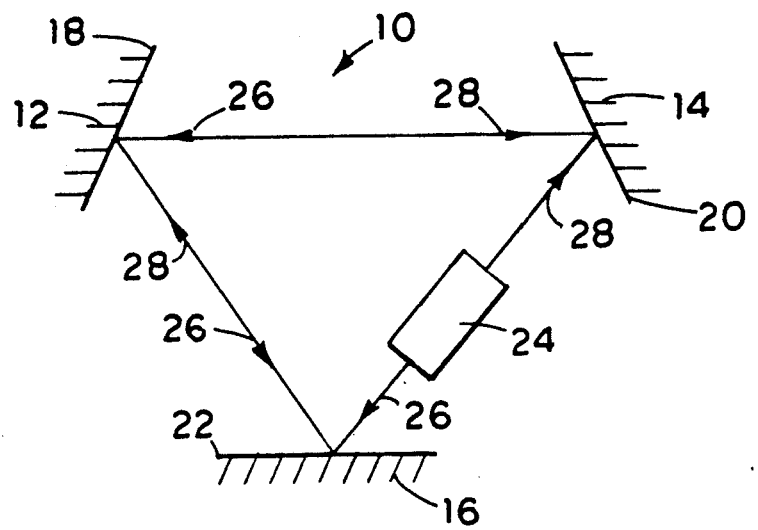
FIG. 1 is schematic of a ring laser gyroscope system with three superconducting mirrors.

The mirror apparatus of this invention is especially useful with laser gyroscopes comprised of one or more mirrors. Such gyroscopes have been known to those skilled in the art for at least about the last twenty years.

In one preferred embodiment, the laser gyroscope is a ring laser gyroscope having a plurality of sensitive axes. Thus, as is disclosed in U.S. Pat. No. 4,839,903 of Simms et al., such ring laser gyroscope has, for each axis, an optical cavity or ring disposed in a plane at right angles to the associated axis, each cavity comprising three or more linear, and usually equal length limbs. Around each cavity are propagated two beams of light travelling in opposite directions, which beams are directed in continuously rotating paths by mirrors located at the respective cavity corners. The beams of light are produced by laser means, the initial start-up and subsequent operation of which is by excitation of the laser. The disclosure of this Simms et al. patent is hereby incorporated by reference into this specification.

Other laser gyroscopes are described in, e.g., U.S. Pat. Nos. 4,837,774 of Jabr et al., 4,850,708 of Moore et al., 3,503,688 of Lechevalier, 4,470,701 of Smith, 4,477,188 of Stiles et al., 4,407,583 of Simms, 4,397,027 of Zampiello et al., 4,481,635 of Broberg et al., 4,392,229 of Hostetler, 4,616,929 of Bernelin et al., and the like. The disclosure of each of these patents is hereby incorporated by reference into this specification.

In the prior art ring laser gyroscope apparatuses, the mirrors used had a fixed reflectivity. Thus, for example, Japanese patent No. 63144306 discloses a mirror comprised of multilayer dielectric film containing alternating layers of amorphous titanium dioxide and silicon dioxide. Thus, e.g., European patent No. 267672 discloses another multi-layer stack mirror for a laser gyroscope. In applicant's novel mirror, different materials are used, and means are provided to vary the reflectivity of the mirror.

Applicant's novel mirror is comprised of a coating of superconductive material. This material has a critical temperature greater than about 77 degrees Kelvin and, preferably, greater than about 85 degrees Kelvin.

One class of superconductors which may be used are the "Type II" superconductors with a critical temperature greater than about 77 degrees Kelvin. Type II superconductors are characerized by first and second values of critical field, $H_{c,1}$ and $H_{c2}$—in which field penetration occurs at the lowest value to result in pinned fields which persist to much higher $H_{c,2}$ levels. See, e.g., U.S. Pat. No. 4,797,386 of Gygorgy et al. and M. Tinkham, "Introduction to Superconductivity," Chapter 5, page 143 (McGraw-Hill, Inc., New York, 1975), the disclosures of which are hereby incorporated by reference into this specification.

In an especially preferred embodiment, the superconductor material has a critical temperature of at least about 77 degrees Kelvin, is a type II superconductor, and is a ceramic material.

In an especially preferred embodiment, the superconductor material used in this invention has specified $H_{c,1}$ and $H_{c,2}$ properties. The $H_{c,1}$ of these preferred materials is from about 10 to about 100 Gauss. The $H_{c,2}$ of these materials is from about 10 to about 100 Tesla. The second value of the critical field of the superconductor material is generally at least about 10,000 times as great as the first value of the critical field of the material.

High-temperature superconductors which may be used in the invention are described in an article by A. W. Sleight entitled "Chemistry of High-Temperature Superconductors," Science, Volume 242 (Dec. 16, 1988) at pages 1519-1527, the disclosure of which is hereby incorporated by reference into this specification.

One preferred class of superconductors, described on pages 1522-1523 of the Sleight article, is of the formula $R\ Ba_2\ Cu_3\ O_{6+x}$, wherein x is from about 0.5 to about 1.0 and R is a rare earth element selected from the group consisting of yttrium, gadolinium, lanthanum, europium, holmnium, and the like. In one preferred embodiment, R is yttrium.

Another preferred class of superconducting materials is of the formula $(AO)_m\ M_2\ Ca_{n-1}\ Cu_n\ O_{2n+2}$, wherein A is selected from the group consisting of thallium, bismuth, and mixtures of bismuth and lead, m is from about 1 to about 2 (and generally is 1 or 2 when A is thallium and is 2 when A is bismuth), M is selected from the group consisting of barium and strontium, and n is at least 1. In one preferred embodiment, illustrated on page 1523 of the Sleight article, A is thallium, m is 2, M is barium, and n is 3; this composition has a critical temperature of about 122 degrees Kelvin.

FIG. 1 illustrates one preferred embodiment of applicant's invention and depicts a ring laser gyroscope 10 containing a multiplicity of coated mirrors. These mirrors are comprised of substrates 12, 14, and 16 and superconductive coatings 18, 20, and 22. Laser cell 24 generates laser beams in clockwise direction 26 and counterclockwise direction 28.

Laser cell 24, often also referred to as a gain cell, may be any means of generating laser beams. Such means are well known to those skilled in the art and are described, e.g., in the patents mentioned in another portion of this specification and in, e.g., Peter W. Milolnni et al.'s "Lasers," (John Wiley & Sons, New York, 1988) and J. Wilson et al.'s "Lasers: Principles and Applications," supra. The disclosure of these publications is hereby incorporated by reference into this specification.

Superconductive mirrors 18, 20, and 22 may have reflectivities of 100 percent or less. As is known to those skilled in the art, the reflectivity of these coatings/mirrors will vary with the frequency of the incident light, the energy gap of the superconducting material which the mirrors are coated with, the superconductivity of the coating material, the temperature of the coating material, and the like.

When it is desired to detect the optical path of light beam 26 and/or light beam 28, the reflectivity of at least one of mirrors 18, 20, and 22 may be decreased so as to increase the transmittance of the mirror. As is known to those skilled in the art, the transmittance of the mirror is equal to the difference between 1.0 and the reflectivity.

The light transmitted through mirror 18 and/or 20 and/or 22 may be sensed by an optical sensor (not shown in FIG. 1). This sensor should be sensitive to light in that portion of the optical spectrum corresponding to the wavelength of the laser beams 26 and/or 28. When it is desired to activate the sensor, the transmittance of one or more of mirrors 18, 20, and 22 may be increased by decreasing the reflectivity of such mirror(s). As soon as the detection/measurement is completed, one may then increase the reflectivity of the mirror(s) and decrease the transmittance.

Optical sensors are well known to those skilled in the art and are described, e.g., in pages 574-576 of the "McGraw-Hill Encylopedia of Electronics and Computers," (McGraw-Hill Book Company, New York, 1984), and on pages 258-264 of J. Wilson et al.'s "Lasers: Principles and Applications," supra. Circuits utilizing optical sensors are also well known. Thus, by way of illustration and not limitation, one may use a circuit similar to that shown on page 364 of Rudolf F. Grafs "The Encyclopedia of Electronic Circuits," First Edition, Fourth Printing (Tab Books, Inc., Blue Ridge Summit, Pa., 1985). The disclosure of each of these publications is hereby incorporated by reference into this specification.

The signals generated by the optical sensor may be fed to a data processor, such as a computer, wherein the data may be analyzed and from which the rotational motion can be determined. Such optical sensor/data processing systems are well known to those skilled in the art and are in commercial use with laser gyroscopes presently on the market.

In another embodiment of the invention, not shown, the optical path(s) of light beams 26 and/or 28 is not measured via transmitted light but is measured by a sensor (not shown) directly in the path of one or more of beams 26 and/or 28. Thus, by way of illustration and not limitation, cell 24 could include optical sensing means as well as means for generating laser beams. The data generated from the sensing of the optical paths of light beams 26 and 28 could be fed directly to a data processor (not shown). Alternatively, one may measure both transmitted light and reflected light. This embodiment is especially useful when the superconducting coatings 18, 20, and 22 are materials with relatively large absorptions at the wavelength of the incident light. In this case, by increasing the reflectivity of these coatings by the means of this invention, one can substantially increase the intensity of the running laser beams 26 and 28.

Figure 2:
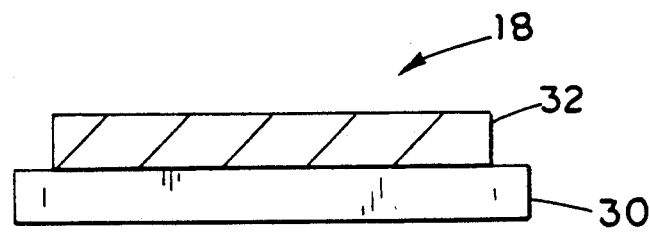
FIG. 2 is a cross-sectional view of one of the mirrors of the gyroscope of FIG. 1.

FIG. 2 is a sectional view of one preferred embodiment of the mirror 18 of this invention. In one preferred embodiment, where the superconductive material is ceramic, such a mirror may contain a protective coating (not shown) such as a thin layer of copper, silver, silica, and the like. These coatings, which are primarily utilized to prevent the escape of oxygen from the superconductive film, are usually less than about 100 Angstroms thick.

Mirror 18 is comprised of substrate 30 and superconducting film 32. Substrate 30 preferably has a crystal structure similar to that of the material deposited on it.

In one preferred embodiment, substrate 30 is inorganic and, preferably, is selected from the group consisting of strontium titanate, yttrium stabilized cubic zirconia, magnesia, sapphire, stainless steel, nickel, silica, gallium arsenide, quartz, and the like.

In one preferred embodiment, substate 30 is optically transparent at the frequency of the incident light of the laser beams. The term transparent, as used in this specification, refers to a material which transmits at least about 99 percent of the incident light.

In another embodiment, substrate 30 transmits less than about 10 percent of the incident light impinging upon it.

It is preferred that the substrate have a thickness of less than about 1 millimeter. When the substrate is separated from the superconductor by a buffer layer, it is preferred that such buffer layer have a thickness of less than about 100 Angstroms.

In one preferred embodiment, a buffer layer (not shown) is formed between substrate 30 and superconducting film material 32. This buffer layer tends to stop diffusion between the superconducting material and the substrate material; and, because its properties are intermediate those of the superconducting material and the substrate material, it tends to provide a crystal match and a thermal expansion match between such materials. By way of illustration and not limitation, suitable buffers include, e.g., cubic zirconia, magnesia, etc. These, and similar, buffers are discussed in, e.g., (1) S. Witanachchi et al., "Laser deposition of superconducting and semiconducting thin films," in "Superconductivity and its applications," edited by H. Kwok et al. (Elsevier Company, New York, 1988), and (2) H. Kwok et al., "Laser evaporation deposition of superconducting and dielectric thin films," Applied Physics Letters, 52, 1825 (1988), the disclosure of which is hereby incorporated by reference into this specification.

In one preferred embodiment, mirror 18 is comprised of a substrate of sapphire and a 1/2/3 yttrium/barium/copper ceramic superconductor layer separated by a buffer layer containing either magnesia or cubic zirconia.

Superconductive film 32 can be deposited onto substrate 30 by conventional means. Thus, by way of illustration, one may deposit such film 32 by laser deposition, electron beam evaporation, direct current sputtering, radio frequency sputtering, chemical vapor deposition, molecular beam deposition, and the like. A thin film of less than about 1 micron may be formed by such techniques. A thick film, of greater than 10 microns but less than 500 microns, may be formed by techniques such as screen printing, pasting, and the like.

Methods of forming a thin film of less than about 1 micron upon the substrate are well known to those skilled in the art. Thus, e.g., reference may be had to S. Witanachchi et al., Applied Physics Letters, 53, 234 (1988); D. K. Lathrop et al., Applied Physics Letters 51, 1554 (1987); K. Char et al., Applied Physics Letters 51, 1370 (1987), and D. Dijkamp et al., Applied Physics Letters 51, 619 (1987). The disclosure of each of these documents, and the references they cite, are hereby incorporated by reference into this specification.

When a thick film superconducting material 32 is to be deposited onto substrate 30, it may be deposited by conventional means such as, e.g., those described in P. Moran's "Hybrid Microelectronic Technology," Electrocomponent science monograms, volume 4 (Gordon and Breach Science Publishers, New York, 1984), the disclosure of which is hereby incorporated by reference into this specification.

In one embodiment, the thickness of superconducting film 32 is from about 0.5 to about 1.0 micron, and the thickness of substrate 30 is from about 0.5 to about 1.0 millimeter.

Figure 3:
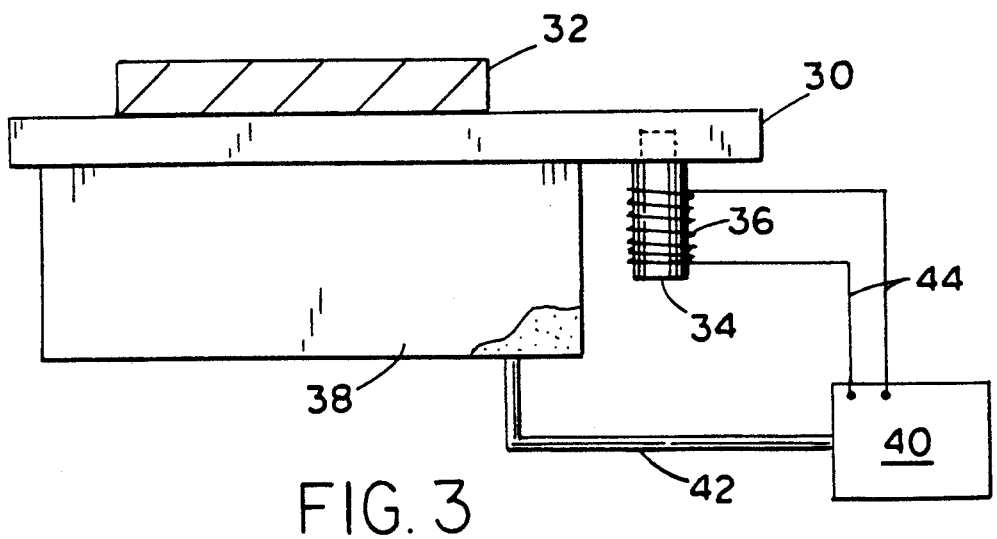
FIG. 3 is a schematic of one preferred embodiment of the mirror of the invention illustrating one means for controlling the reflectivity of such mirror.

Referring to FIG. 3, a means is shown for controlling the reflectivity of superconductive film 32. In this embodiment, heating core 34 (which generally consists essentially of copper) is surrounded by winding 36; when current is passed through winding 36, heat is generated in the winding, transmitted to core 34 by thermal conduction, and then transmitted via core 34 to substrate (holder) 30. Leads 44 extend from core 34 to controller 40.

As the temperature of substrate 30 is changed, the temperature of superconductive film 32 is also changed. The change in temperature of the superconductive material 32 affects its reflectivity; see, e.g., W. A. Little, "Experimental Constraints on Theories of High-Transition Temperature Superconductors", Science, Vol. 242 (Dec. 9, 1988), pages 1390–1395; and G. A. Thomas et al., $Ba_2 Y Cu_3 O_{7-x}$: Electrodynamics of Crystals with High Reflectivity," Physical Review Letters, Volume 61, Number 11 (Sept. 12, 1988), pages 1313–1316. The disclosures of these documents are hereby incorporated by reference into this specification.

Controller 40 preferably is comprised of a data processor which can analyze information from element 38 and make appropriate adjustments in the reflectivity of superconductive film 32, as required. Controller 40 also controls a conventional power supply (not shown) which furnishes direct current to coil 36.

In one preferred embodiment, element 38 is an optical sensor which detects light being transmitted through mirror 32 and optically transparent substrate 30. In this embodiment, data from optical sensor 38 is fed via line 42 to controller 40 which, after making an appropriate evaluation of such data, may alter the reflectivity of superconductive layer 32 and/or report said data to a navigation device (not shown). It will be apparent that, although means for cooling the superconductive film 32 are not shown for this embodiment, they may be provided by conventional means. Thus, by way of illustration, part or all of apparatus 32 may be contained in a cooler which provides cooling power. In this embodiment, the cooler may be operatively connected to controller 40, which will regulate its amount of cooling. A temperature sensor (not shown) is near and/or operatively connected to superconductive film 32; and the temperature sensor is operatively connected to controller 40. Thus the temperature of the superconducting film can be adjusted and stabilized via controller 40.

When the temperature of superconductive film 32 is below its critical temperature, its reflectivity is substantially higher than when such temperature is higher than its critical temperature. Thus, by way of illustration, for most superconductive materials, the reflectivity is greater than about 95 percent when the temperature of the material is at least 5 degrees below the critical temperature of the material. However, for such materials, the reflectivity will usually be less than about 1 percent when the temperature is at least about 5 degrees above the critical temperature of the material.

In another embodiment, element 38 is a means for cooling substrate 30. In this embodiment, line 42 provides a flow of gas and/or liquid into container 38. A thermal sensor (not shown) is near and/or operatively connected to superconductive film 32; and the thermal sensor is operatively connected to controller 40; in this embodiment, the thermal sensor may be incorporated into gain cell 24 (see FIG. 1). Thus, controller 40 may regulate the temperature of superconductive film 32 (and, thus, its reflectivity) by either changing the amount of current flowing through wires 36 and/or changing the amount of coolant flowing through line 42 and/or changing the temperature of the coolant in container 38.

Figure 4:
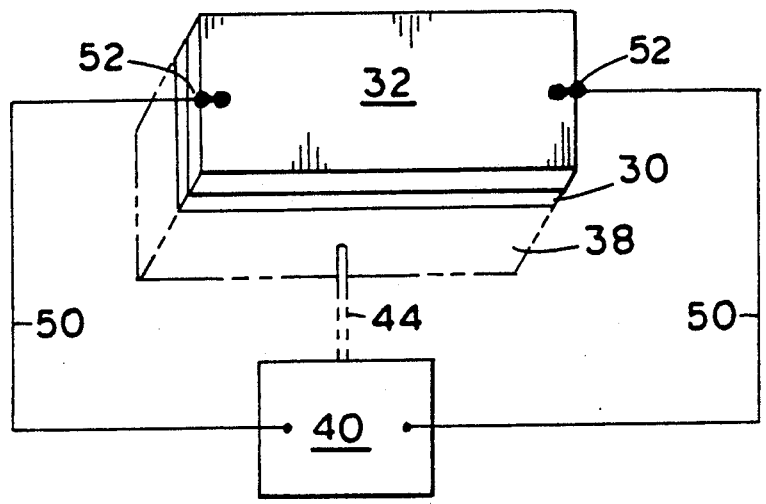
FIG. 4 is a schematic of one preferred embodiment of the mirror of the invention illustrating another means for controlling the reflectivity of such mirror.

FIG. 4 illustrates another preferred embodiment of the invention in which the reflectivity of superconductive layer 32 is varied by varying the superconductivity. By varying the amount of current passing through superconductor 32, the superconductivity of such layer may be diminished and/or destroyed, thereby affecting the reflectivity of such layer. As is known to those skilled in the art, reflectivity varies with the energy band gap of the superconductive material which, in turn, will change when the material goes from being superconductive to being non-superconductive. As is also known to those skilled in the art, each superconductor has a critical current density beyond which its superconductive properties diminish, and eventually cease.

Referring to FIG. 4, controller 40 is comprised of a power supply which, in turn, is operatively connected to superconductive plates 32 via leads 50 and contacts 52. In the manner described for the apparatuses of FIGS. 2 and 3, controller 40 is also operatively connected to temperature sensor (not shown) which is located near or next to superconductive film 32.

When it is desired to alter the reflectivity of superconductive film 32, controller 40 can do this by one or both of several different means. In one embodiment, wherein element 38 is a cooling chamber, controller 40 furnishes coolant via line 44 to cooling chamber 38 and, alternatively or additionally, supplies current to superconductive layer 32. In another embodiment, where element 38 is an optical sensor, controller 40 may vary the superconductivity of film 32 by supplying current to superconductive plate 32.

Figure 5:
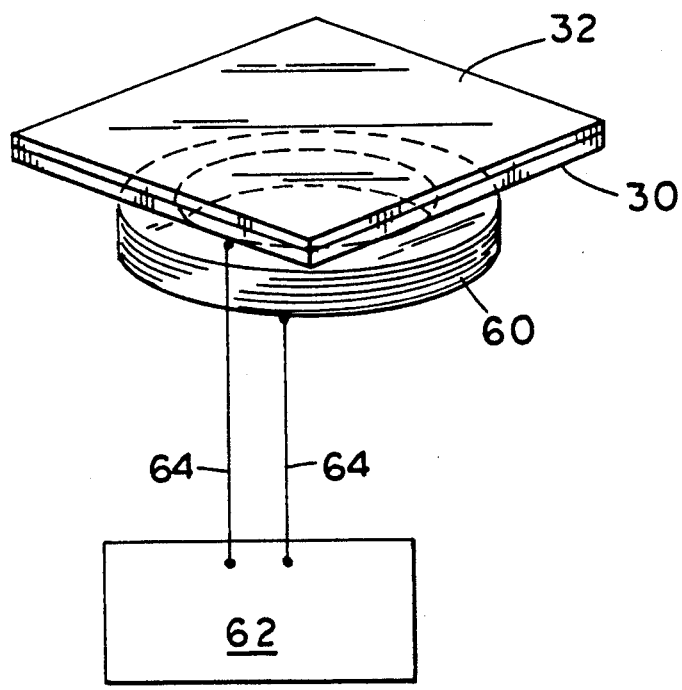
FIG. 5 is a schematic of one preferred embodiment of the mirror of the invention illustrating yet another means for controlling the reflectivity of such mirror.

FIG. 5 illustrates yet another means for varying the reflectivity of superconductive plate 32. For the sake of simplicity, elements such as a temperature sensor, an optical sensor, and a cooling/heating means, have been omitted from this Figure.

It is known that magnetic fields affect the superconductivity of materials; see, e.g., the aforementioned Tinkham reference. When the magnetic field is higher than the value of the first critical field of the superconductor, then the superconductivity of the material begins to be destroyed. As the magnetic field approaches the value of the second critical field of the superconductor, the superconductivity tends to disappear.

The apparatus of FIG. 5 utilizes this phenomenon. Controller 62, which is comprised of a direct current power supply (not shown), creates an electromagnetic field in coil 60 (via wires 64) which, because of its proximity to substrate 30 and superconductive plate 32, has its flux lines interact with the superconductive material. Thus, when controller 60 receives an appropriate input from a temperature sensor (not shown) and/or a switch (not shown) and/or another source, it can vary the reflectivity of superconductive film 32 by creating or varying the intensity of the electromagnetic field in coil 60.

In another embodiment of this invention, a superconductive optical-fiber gyroscope is provided. A conventional optical fiber gyroscope is disclosed on page 156 of J. Wilson et al.'s "Lasers: Principles and Applications," supra (see FIG. 4.18). In applicant's invention, the conventional optical fiber of this gyroscope is replaced by superconductive optical fiber whose reflectivity may be varied by one or more of the means disclosed in this specification with reference to embodiments of FIGS. 1, 2, 3, 4, and 5. Such superconductive fiber may be formed by extrusion of a mixture of superconductive material and organic binder; the extruded wire may then be wound into the shape of a coil and thereafter fired at a temperature in excess of about 900 degrees centigrade for at least about 12 hours.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:
1. An apparatus for reflecting a light beam, wherein said apparatus is comprised of:
   (a) a mirror assembly comprising a substrate and a superconductive mirror formed on such substrate, wherein:
      1. said substrate is optically transparent to said light beam and has a thickness of from about 0.5 to about 1.0 millimeter, and
      2. said superconductive mirror has a thickness of from about 0.5 to about 1.0 microns;
   (b) means for cooling said superconductive mirror;
   (c) means for measuring the temperature of said superconductive mirror;
   (d) means for determining the reflectivity of said superconductive mirror; and
   (e) means for varying the reflectivity of said superconductive mirror.

2. The apparatus as recited in claim 1, wherein said superconductive mirror is comprised of superconductive material with a critical temperature of greater than about 77 degrees Kelvin.

3. The apparatus as recited in claim 1, wherein said superconductive mirror is comprised of superconductive material with a critical temperature of greater than about 85 degrees Kelvin.

4. The apparatus as recited in claim 3, wherein said superconductive material is a Type II superconductor.

5. The apparatus as recited in claim 4, wherein said superconductor is a ceramic material.

6. The apparatus as recited in claim 5, wherein the first critical field of said superconductor is from about 10 to about 100 Gauss.

7. The apparatus as recited in claim 6, wherein the second critical field of said superconductor is from about 10 to about 100 Tesla.

8. The apparatus as recited in claim 7, wherein the ratio of said second critical field to said first critical field is at least about 10,000.

9. A ring laser gyroscope comprised of at least one of the apparatuses of claim 1 and a means for generating a laser beam.

10. The gyroscope as recited in claim 9, wherein said superconductive mirror is comprised of superconductive material with a critical temperature of greater than about 77 degrees Kelvin.

11. The gyroscope as recited in claim 9, wherein said superconductive mirror is comprised of superconductive material with a critical temperature of greater than about 85 degrees Kelvin.

12. The gyroscope as recited in claim 11, wherein said superconductive material is a Type II superconductor.

13. The gyroscope as recited in claim 12, wherein said superconductor is a ceramic material.

14. The gyroscope as recited in claim 13, wherein the first critical field of said superconductor is from about 10 to about 100 Gauss.

15. The gyroscope as recited in claim 14, wherein the second critical field of said superconductor is from about 10 to about 100 Tesla.

16. The gyroscope as recited in claim 15, wherein the ratio of said second critical field to said first critical field is at least about 10,000.

* * * * *